United States Patent [19]
Hellman

[11] Patent Number: 5,872,917
[45] Date of Patent: Feb. 16, 1999

[54] AUTHENTICATION USING RANDOM CHALLENGES

[75] Inventor: Martin E. Hellman, Stanford, Calif.

[73] Assignee: America Online, Inc., Dulles, Va.

[21] Appl. No.: 947,053

[22] Filed: Oct. 8, 1997

Related U.S. Application Data

[63] Continuation of Ser. No. 482,013, Jun. 7, 1995, abandoned.

[51] Int. Cl.[6] .................................................. G06F 11/00
[52] U.S. Cl. ................................ 315/188.01; 395/187.01; 395/200.59
[58] Field of Search ............................. 395/186, 187.01, 395/188.01, 200.59; 705/18, 44; 707/9; 711/163, 164; 380/1–59

[56] References Cited

U.S. PATENT DOCUMENTS

| | | | |
|---|---|---|---|
| 4,200,770 | 4/1980 | Hellman et al. | 178/22 |
| 4,218,582 | 8/1980 | Hellman et al. | 178/22 |
| 4,264,782 | 4/1981 | Konheim | 380/25 |
| 4,351,982 | 9/1982 | Miller et al. | 178/22.11 |
| 4,424,414 | 1/1984 | Hellman et al. | 178/22.11 |
| 4,567,600 | 1/1986 | Massey et al. | 375/2.1 |
| 4,590,470 | 5/1986 | Koenig | 340/825.31 |
| 4,723,284 | 2/1988 | Munck et al. | 380/25 |
| 4,779,224 | 10/1988 | Moseley et al. | 395/188.01 |
| 4,964,164 | 10/1990 | Fiat | 380/30 |
| 5,371,794 | 12/1994 | Diffie et al. | 380/21 |
| 5,428,745 | 6/1995 | de Bruijn et al. | 395/187.01 |
| 5,491,752 | 2/1996 | Kaufman et al. | 380/30 |

OTHER PUBLICATIONS

A User Authentication Scheme Not Requiring Secrecy In The Computer, Operating Systems, Communications of the ACM, Aug., 1974, vol. 17, No. 8, Authors: Arthur Evans, Jr., et al.

Privacy And Authentication: An Introduction To Cryptography, Authors: Whitfield Diffie and Martin E. Hellman.

Password Security: A Case History, Operating Systems, Communications of the ACM, Nov., 1979, vol. 22, No. 11, Authors: Robert Morris, et al.

A High Security Log–In Procedure, Operating Systems, Communications of the ACM, Aug., 1974, vol. 17, No. 8, Authors: George B. Purdy.

*Primary Examiner*—Robert W. Beausoliel, Jr.
*Assistant Examiner*—Pierre E. Elisca
*Attorney, Agent, or Firm*—Standley & Gilcrest

[57] ABSTRACT

A method is disclosed for authenticating one or both of two parties, for example, a user and a host computer. The first party and second party each know the same password. The first party sends a challenge to the second party. The second party generates and sends to the first party a response based on a first function of the password, the first party's challenge, and an extra value unknown to the first party. The first party, which knows only the length of the extra value, then attempts to match the response by using the same function, password, and challenge by cycling through the possible values for the extra value of known format. A method of bi-directional authentication may be achieved by having the first party return to the second party a response using a different function of the password, a preferably different challenge, and the extra value. The second party already knows the input values, including the extra value, and therefore, does not incur the costs associated with learning the extra value. The identity of the first party is confirmed by matching the transmitted response with a value generated locally.

19 Claims, 3 Drawing Sheets

DATA FLOW BETWEEN USER AND HOST COMPUTER

DATA FLOW BETWEEN USER AND HOST COMPUTER

AUTHENTICATION USING RANDOM CHALLENGES

This application is a file wrapper continuation of application Ser. No. 08/482,013 filed Jun. 7, 1995.

BACKGROUND OF THE INVENTION

1. Field of the Invention

This invention relates generally to a system for authentication between two parties—for example, a user and a host computer. More particularly, the present invention relates to a system for generating challenges and responses, based on a function generated from specific input values, between an authenticating party and a party to be authenticated in order to establish the identities of either or both.

2. Description of the Related Art

One method for protecting valuable computer based resources and digital services, such as computer time sharing services, computer information services (e.g., CompuServe® Information Service), automated teller machines, pay television, etc., is to employ an authentication mechanism that controls access to the computer or service (the host). Authentication protects resources by stopping vandals before they enter the host. Today, most authentication methods require a computer or service user (the user) to prove his or her identity before accessing the host. Therefore, authentication takes place during an initial login sequence. If the user is unable to prove his or her identity during this sequence, access to the host will be denied. While authentication may be enforced only during an initial login sequence, it may also be enforced throughout an entire session so that the host and/or user identities are authenticated with each transmission or after some number of transmissions during the session.

During any authentication sequence, security may be breached in several ways. First, the user may not be the person he or she purports to be and is in reality, a computer vandal (an opponent). Second, the host may not be the entity it purports to be so that the user logs into an imposter host which can then gain valuable personal information (e.g., credit card numbers). Finally, an eavesdropper may be monitoring the exchange between the user and the host in order to capture information that may be used to breach security during this or a subsequent session. Given the possible security breaches that may occur during an authentication sequence, there is a need for individuals who use various computer based services or other digital services to be able to identify themselves to the host in a way that makes impersonation by anyone else difficult, and preferably, impossible. In some applications, authentication may be carried out continuously throughout the session.

Most login sequences begin with the host prompting the user for an identification name or number and a password (sometimes called a personal identification number or PIN). This approach involves a two stage process in which the user and host first agree on a user ID, such as an authentication name or number, and an associated password. This is done in a secure manner—for example, in a personal meeting or via mail. Both the host and the user store these values. When the user desires service, he sends his user ID and password to the host. The host then compares the offered password with the value previously stored by the host for that user. If the offered and stored passwords agree, the user is granted access to services. If they disagree, the user is prompted to try again because users make occasional typing errors. However, the rate at which passwords may be tried is often limited (e.g., once every five seconds) to prevent automated attacks in which passwords are tried at electronic speeds—potentially thousands of passwords per second. For similar reasons, the number of incorrect login attempts is often limited (e.g., to three) before the user account is put on hold pending investigation of a possible attack. These limits place little or no burden on legitimate users because humans can only enter a password once every few seconds and rarely enter incorrect passwords many times in a row. However, these limits may thwart the efforts of an opponent using an automated attack because the attack is at least interrupted if not stopped completely.

Security under this mechanism may be breached when the user ID and password are told to, guessed, or captured by an opponent. One method for capturing passwords is to eavesdrop on channels carrying passwords. "Password login" security has sufficed for many services that rely on the dial-up telephone network because eavesdropping on a telephone call carried over the dial-up network requires a wiretap—an invasive act susceptible to detection and apprehension of the wiretapper. However, "password login" is highly insecure when used on new, shared communication channels such as local area networks (LANs), the Internet, cellular telephones, etc. Eavesdropping on shared communication channels is accomplished easily, with little chance of detection, because of their shared nature. For example, on a LAN, each user's computer sees all messages going to any other computer, but a legitimate user's network adapter (e.g., an Ethernet card) is programmed to only pick off and store those messages with that user's address. It is a simple matter, almost impossible to detect, for the user to reprogram the network adapter to store all messages with one or more other users' addresses. Debugging tools in some network adapters facilitate eavesdropping under so-called "promiscuous listening mode." This mode is intended for network administrators' trouble shooting, but may be used by dishonest users as well.

Challenge-response schemes attempt to address the eavesdropping problem. When the host computer answers the user's authentication request, it initiates a dialog by sending the user a challenge which either never repeats—for example, the date and time—or has negligible probability of repeating—for example a 64-bit random value. The user's computer receives the host's challenge, encrypts it under a password supplied by the user, and returns the response to the host. The host also knows this password and can authenticate the user's identity by comparing this user's response with a correctly encrypted version of the challenge. Because the password itself is never sent, an eavesdropper must cryptanalyze the system in order to impersonate a user.

Variations of this challenge and response authentication include requiring the user to send a challenge to the host so that the host authenticates itself to the user, thereby preventing an opponent from posing as the host. Under this scheme, the user sends a challenge to the host, the host generates the response to the challenge as above, and the user checks the validity of the host's response. Authentication of the host may be important if the user is communicating confidential information.

Bi-directional or mutual authentication, in which both host and user authenticate each other, is also clearly possible. Under this two-way scheme, the user must prove his or her identity to the host and the host must prove its identity to the user. In some instances (e.g., if the challenge is the date and time), the challenge may be generated by the user or a third party, rather than by the host. In the former case, the challenge need not be transmitted to the user. A similar option exists in bidirectional authentication.

While such challenge-response schemes provide a defense against eavesdroppers, short passwords are insecure because an eavesdropping opponent can search through all possiblities rapidly. In particular, short passwords are often susceptible to "dictionary attacks" in which an opponent attempts to guess the password by monitoring the challenges and responses and testing frequently used passwords (e.g., the user's name) by performing the same operations as the user and host computers. Dictionary attacks may be thwarted by requiring longer passwords, perhaps as long as cryptographic keys. For example, if the Data Encryption Standard (DES) is used as the cryptographic system in the challenge and response authentication, and if the password is a 56-bit totally random value (the size of DES's key), then an opponent must search $2^{56}$=7E16 values. If the password is four alphanumeric characters, instead, the opponent must search only $36^4$=2E6 values. If the opponent can search 1E5 values per second (a typical value for a modem PC), searching for the totally random key takes 7E11 seconds= 20,000 years, but, searching for a four character alphanumeric key takes only 20 seconds.

If the password must be memorized or entered manually by the user, there is great user resistance to using long, random passwords. Even when passwords are stored in script files that are communicated automatically to the host, many users select passwords that are short or non-random.

SUMMARY OF THE INVENTION

The present invention addresses the problems of short or non-random passwords present in current authentication schemes, and, particularly, challenge-response authentication schemes. In the authentication scheme of the present invention, the authenticating party and/or the party to be authenticated prove that they know a shared password. Proof of knowledge of the password is provided without actually revealing the password during the exchange of data in an authentication sequence. In a unidirectional authentication scheme using the present invention, in which the host computer verifies the identity of the user, the following exchange may take place. First, the host computer sends a challenge to the user. The user takes the challenge and generates a response based on a function of the password and additional input values. The user sends the response to the host computer which then compares the response to the result of a function applied to the password and additional input values. Identity of the user is confirmed when the host computer generates locally a match for the response from the user.

The user's response is based on the result of a function that includes an extra input value, called PAD, which is unknown to the host. The use of the value PAD is unique to the present invention. To confirm the identity of the user, the host, which knows the format of the extra input value, but not the actual value, may need to try all possible values for the extra input value in attempting to match the user's response. While a usual goal is to minimize the computational cost to the host and user, one of the surprising advantages of the present invention is the increased cost of generating a response—in this instance, the host response, because that cost increase also extends to the opponent. As a result, the present invention increases the difficulty of dictionary attacks by increasing significantly the number of operations an opponent must perform to generate a match and learn a password.

The extent of the cost increase may be illustrated by examples. However, the computation times described herein are representative only. Host computation times that are greater or less than those provided in the examples may result from various embodiments of the present invention. The examples provided are not intended to limit the scope of the present invention to the particular embodiment described herein.

In previously known challenge-response authentication schemes, if computation of a response takes 0.01 msec on a $2,000 PC, the corresponding cost per authentication to the host and the user is approximately $2E-10 ($2,000 divided by the number of 0.01 msec in three years, the approximate useful life of the PC.) An opponent who must search 2 million "short" passwords on a similar machine has a cost 2 million times as large, or $0.0004—a trivial sum for obtaining a password. As noted above, the search may be accomplished in 20 seconds on a PC. Because all three costs are so small, it pays to increase the computation time of each response to 100 seconds, ten million times longer than before. Then, the costs to the host and the user increase by a factor of ten million to $0.002—which is still insignificant—while the opponent's cost also increases by a factor of ten million to $4,000—a point at which attacking the system may not be economical. If the opponent is limited to using a single PC, the computations take 2 years.

While a cost of $0.002 to host and user is reasonable, the attendant delay time of 100 seconds to authentication, needed to achieve this cost, is unacceptable. If, as is often the case, the host generates many responses every minute, it can overcome this delay by using powerful workstations. The high capital cost of this equipment is offset by the large number of responses computed so that the cost per response is still $0.002, provided the workstations are kept fully loaded.

If, as is true for a large computer information service, thousands of authentications are handled each hour, it is also possible to use special purpose hardware to generate responses at the host. In addition to reducing the authentication delay to a reasonable level, special purpose hardware can give the host an economic advantage if the response algorithm is designed to be hardware prone (i.e., having a high ratio of computation cost in software vs. hardware.)

While the time delay at the host can be made reasonable, users cannot afford to invest in fast workstations or special purpose hardware merely to speed up authentication. Unlike the host, users rarely generate responses so such devices would be idle most of the time with a large attendant increase in the cost per authentication. The problem is thus reduced to one of increasing the host's cost of generating responses without increasing the user's cost. The present invention accomplishes this goal through the use of an extra input value. The extra input value is a padding value PAD—chosen by the user's computer—to lengthen the password. If, for example, the password is four characters long and DES is used as the basis of the challenge and response authentication system, then 24 random bits may be used for PAD. In an ASCII representation, a four character password is 32 bits long so adding 24 PAD bits makes it 56 bits long, the right size for a DES key. A 24 bit PAD results in $2^{24}$=17 million possible values, close to a cost increase factor of ten million used earlier as an example.

Because PAD is known to the user, he does not see any change from the situation before PAD was introduced and can generate the response in 0.01 msec at a cost of $2E-10. But the host, which does not know PAD, must generate the response to its challenge for the password and PAD concatenation for each of the $2^{24}$ possible values of PAD and accept the response as valid if any PAD value results in the received response. It is seen that the host's cost increases by a factor of $2^{24}$ to $0.004, while the user's cost, and more importantly, delay are unchanged. Most importantly, an eavesdropping opponent who tries to learn the password by encrypting the challenge under all possible password and PAD concatenated values also sees an increase in cost by a factor of $2^{24}$ (to $7,000) compared to the situation before PAD was added. Thus, the use of PAD increases the host's and the opponent's cost in an easily controlled manner, while leaving the user's cost and delay unchanged.

Another advantage of the present invention is that the cost to the host and opponent may be controlled independently of the cost to the user. This is important in an environment where users have vastly different computing abilities, as is the case today where a computer information service must serve a pool of users whose computers range from the original IBM PC through 100 MHz Pentium systems—a range of approximately 100 in computing power. The time to compute the user response to the host's challenge must be reasonable on the slowest of these user computers, but without the present invention's use of PAD, that may allow an opponent to search probable passwords 100 times faster than if the service could assume all users had powerful computers. The present invention allows the service to add 2 digits to PAD, increasing the cost to the host and opponent by a factor of 100, the factor by which the service would have liked to increase the response computation time if all users had modem, powerful computers. The increased cost to the host is not a problem because it will be equipped with modem, fast computers.

If bi-directional or mutual authentication is desired, the reverse operation may used so that the user challenges the host and the host chooses a PAD value. However, under this scheme, the user's delay would increase unacceptably. The present invention may address this problem by having the user first authenticate himself to the host and then having the host authenticate itself to the user using the same PAD value chosen by the user and now known to the host. The cost to the host and user of this second authentication is unaffected by the use of PAD because the host has already paid the price for learning PAD when verifying the user's response. An opponent who attacks either response in an attempt to learn the password has his cost increased by the number of PAD values.

The present invention offers several advantages over previously known authentication schemes, particularly, challenge and response authentication schemes. The security of the authentication, based on the addition of PAD, is improved even when relatively short passwords are used. The likelihood of successful dictionary attacks is also reduced because the number of eavesdropper computations needed to search a set of probable passwords (e.g., names) is increased significantly. However, no additional time is needed for the user to generate his response or to validate the host's response. These advantages and others are explained further by the accompanying drawings and detailed description.

DETAILED DESCRIPTION OF PREFERRED EMBODIMENT(S)

Figure 1:
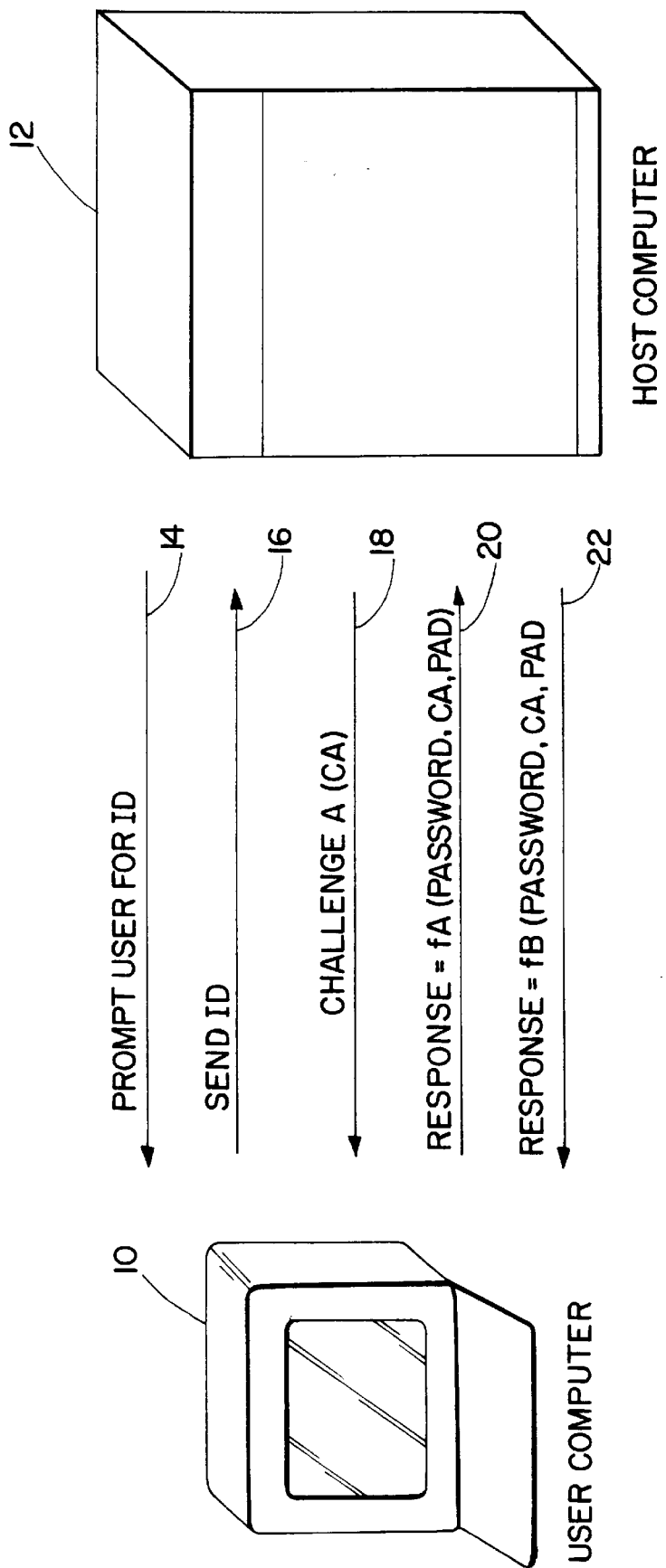
FIG. 1 is a schematic representation of the flow of data between the user's and host computer.

Referring now to FIG. 1, there is shown the flow of data between the user's computer 10 and the host computer 12. The user is assigned, prior to any communications, an identification sequence and a password known also by the host computer. Furthermore, the host and user computers know, prior to the exchange of data, what functions should be applied to the exchanged data. FIG. 1 represents a preferred embodiment of the present invention. The exchange of information may take place in a different order. In addition, the number of values exchanged between the user and host computer could be lesser or greater than the number provided in the preferred embodiment. The source of the values may vary in different embodiments of the present invention. Also, the types of values may be different. Finally, although the preferred embodiment involves bi-directional or mutual authentication, unidirectional authentication is also possible so that only the host verifies the identity of the user or only the user verifies the identity of the host.

The authentication dialog, or protocol, involves the exchange of, preferably, four values: the user's ID 16, the host's challenge 18, the user's response 20, and the host's response 22. Preferably, the standard protocol translates all exchanges into line-oriented text. The worst impact of line noise is a failure to log in to the host.

Preferably, the protocol uses a simple checksum on each exchanged value. The checksum may be useful for assistance in auditing the process. If the arriving data have an incorrect checksum or cannot be understood, then the problem is most likely line noise. If however, the checksum is correct, then a failure to log in usually means the user did not know the password and is more likely to be an opponent.

In the preferred embodiment, the exchange begins with the host computer 12 sending a prompt 14 to the user 10 for an identification name or number. The user responds with a user ID 16. The host then sends to the user a challenge CA 18. Then, the user sends to the host computer a response 20 generated from the password, the host's challenge, and an extra value PAD 20 using a function FA. Other values, such as a challenge from the user, also may be used in generating the response. The host verifies the identity of the user by comparing the user's response 20 to its own internally generated response using the same function with the same input values.

For bi-directional authentication, the user may verify the identity of the host. The host generates and sends to the user a response generated from a different function FB of the password, the host's challenge, and the user's extra value PAD that was sent earlier 22. The user verifies the identity of the host by comparing the host's response to his internally generated value using the function FB with the same input values. Other values, such as a challenge from the user, also may be used in generating the response.

Figure 2A:
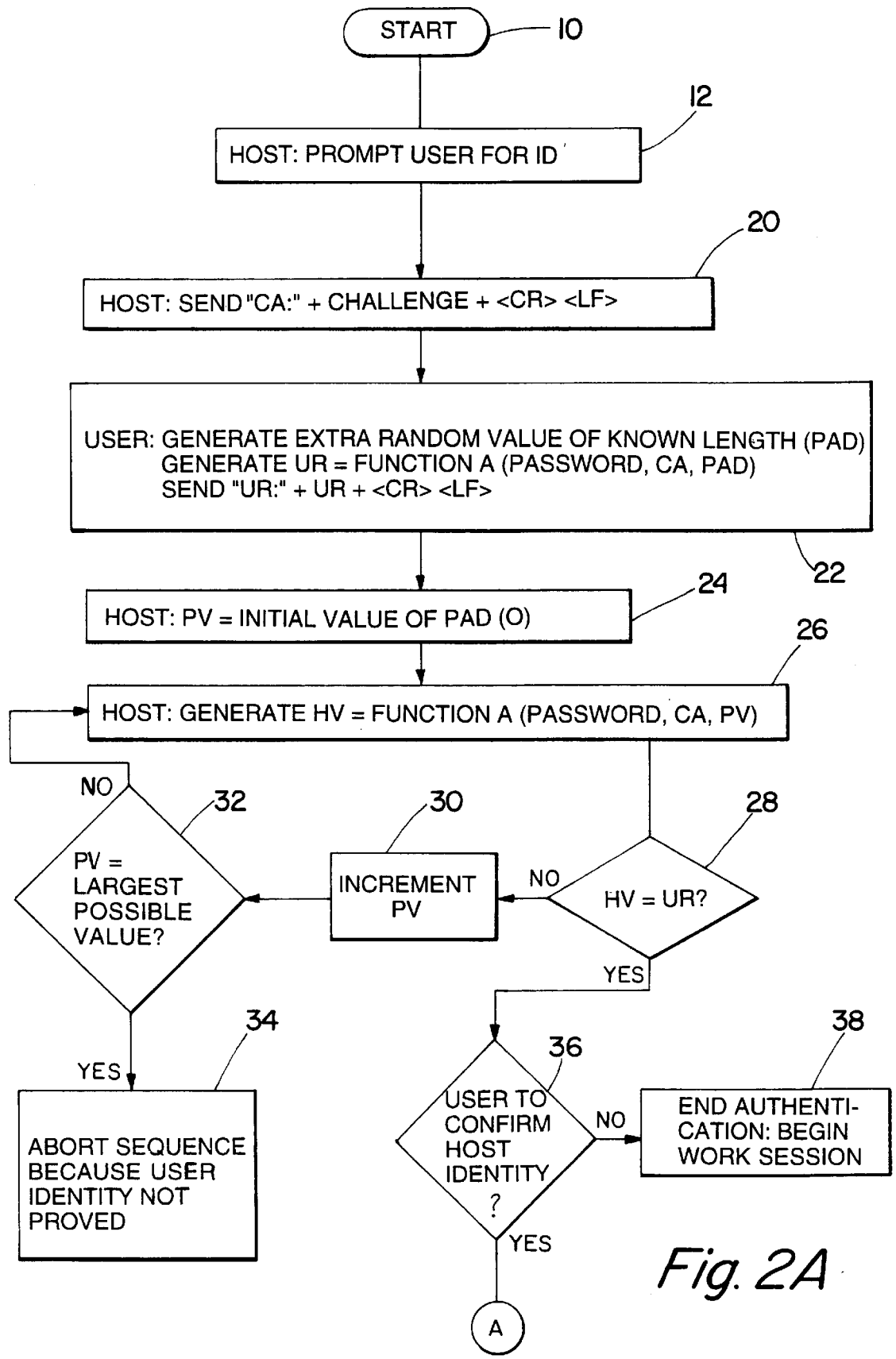
FIG. 2A is a flow chart of the authentication sequence for host computer authentication of the user.
Figure 2B:
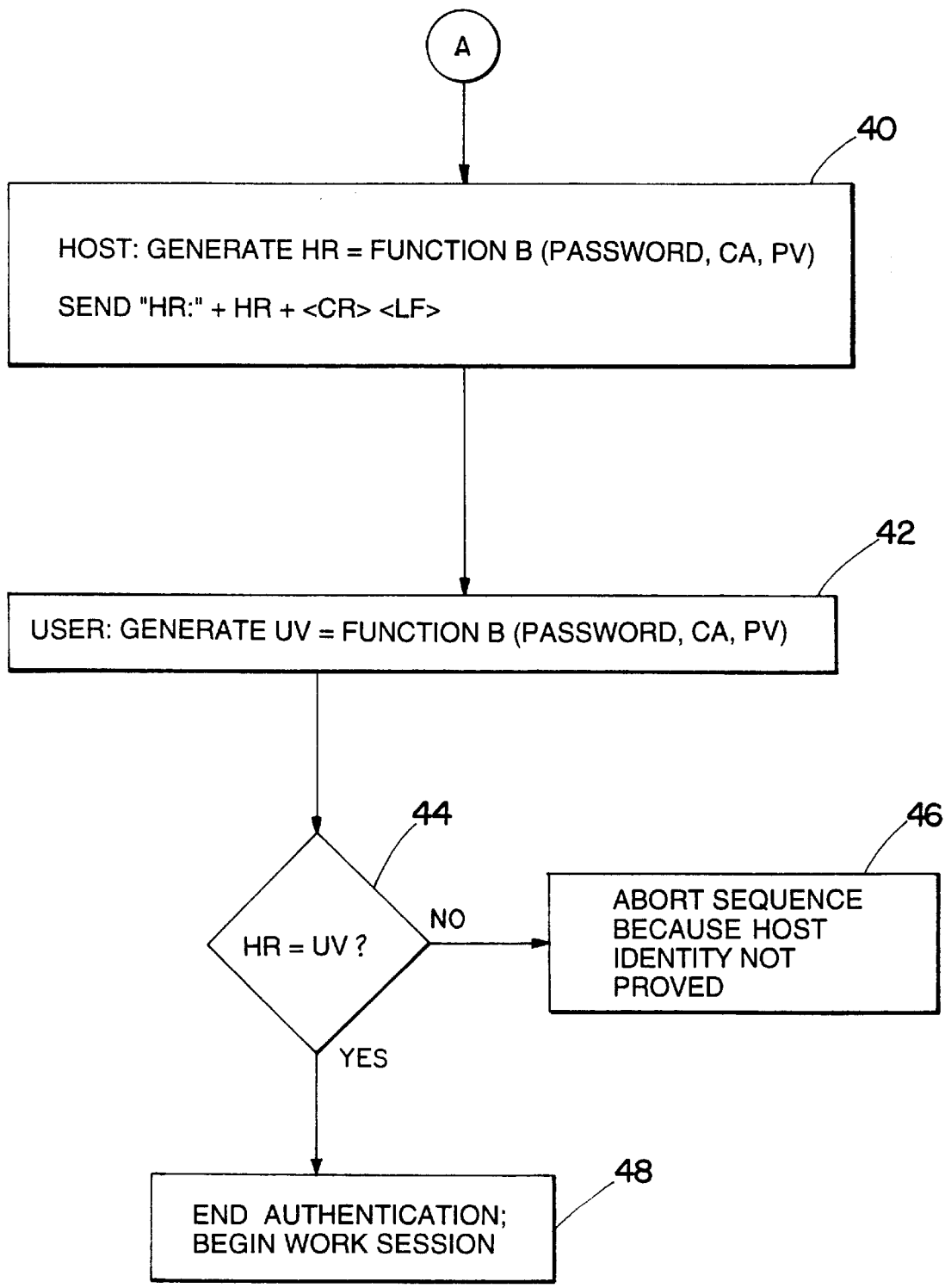
FIG. 2B is a flow chart of user authentication of the host computer.

Referring now to FIG. 2A, a preferred embodiment of the authentication sequence is shown. The host begins the authentication process by prompting the user for his or her ID 12. In the next step, the host generates a challenge, CA, 20. The process of generating a challenge is well known in the art and is not explained here. For example, the challenge may be a random value or the date and time. Challenges of other sizes and origins may be used as well. The host then sends to the user the challenge, preferably, in the format "CA:" plus the challenge followed by a carriage return and line feed 20.

Next, the user generates a response, "UR", to send to the host computer 22. The host computer uses this response to verify the identity of the user. To generate the response UR, the user first generates an extra value PAD of a format known to the host computer. This extra value is not transmitted to the host computer. The use of this extra value PAD is unique to the present invention. The response UR depends on the password, the host's challenge (CA), and the extra value of known format (PAD). Preferably, the response is generated from a one-way function (functionA) that is easy to compute, but difficult to invert such as the MD5 digest or DES function. These functions are well known in the art and are not described here. Many other functions may work as well. The user then sends to the host computer the response, preferably, in the format "UR:" plus the response followed by a carriage return and line feed 22.

In steps 24–38, the host computer attempts to verify the identity of the user by comparing its own results, using the same function and input values, with the user's response (UR). The extra value (PAD) used in the calculation of the user's response (UR) above, however, was not transmitted to the host. Therefore, to find a matching value, the host may be required to try all possible values (PV) of the known format. Preferably, the host cycles through all possible values for the known format, beginning at 0, 24 and tests them in order 26, 28, 30, 32. The values may actually be tested in any order—for example, ascending, descending, or random. For each possible value, the host generates a value (HV), preferably using the same one-way function (FA) of the password, the host's challenge (CA), and the extra value of known format (PV) 26. The host compares this generated value (HV) to the user response (UR) to verify the user's identity 28. If the host value (HV) and user response (UR) do not match 28, the host increments the extra value (PV) 30. If the incremented value (PV) is still within the range of possibilities 32, then the host generates a new value (HV) using the new extra value 26. If the host value (HV) and user response (UR) do not match 28 and all possible extra values have been tried 32, then the user does not know the password and the authentication sequence aborts 34. If the host value HV and the user's response UR match 28 for any value of PV, then the user is authenticated and the host has learned PAD.

In step 36, a test for bi-directional authentication is made 36. If host identity is not to be confirmed, then the work session may begin or continue because user identity has been confirmed.

In the bi-directional authentication scheme of the preferred embodiment, the host generates a response (HR) that is a one-way function (functionB) of the password, the challenge (CA), and the extra value (PAD) that the host determined was part of the user response (UR) 40. Preferably, the response is generated from a one-way function that is easy to compute, but difficult to invert such as the MD5 digest or DES function. These functions are well known in the art and are not described here. Many other functions may work as well. Preferably, the function (FB) is not the same one used by the host and user to verify the identity of the user (functionA). The host then sends to the user its response (HR), preferably, in the format "HR:" plus the response followed by a carriage return and line feed 40.

The user attempts to verify the identity of the host by comparing its own results, using the same function (functionB) and input values, with the host's response (HR). The user generates a value (UV) 42 using the password, the challenge (CA), and extra value (PAD) generated in step 22. If the host response (HR) and user value (UV) do not match 44, then the host does not know the password and the authentication sequence aborts 46. If the host response (HR) and user value (UV) match 44, then the identity of the host is verified and the user may begin or continue a work session 48.

The present invention offers several advantages over known authentication mechanisms. The method increases costs for both the host and an opponent. The cost increase for the host, however, is manageable because its base cost, before the increase, was lower. Additionally, the host's cost may be managed by use of hardware prone responses and the use of special purpose hardware and/or fast workstations. The cost increase for the opponent, however, is unlikely to be manageable because the opponent's base cost is higher and potentially, the method is expensive in software. As a result, opponents may be deterred from attempting unauthorized access to the host. Most importantly, the method does not increase costs or impose delays for users.

In addition, the host and user are not dependent upon the secrecy of the method or non-obviousness of intercepted data for protection during the authentication sequence. As a result, the mechanism may be published and incorporated in many products. Furthermore, the method of the present invention may be used regardless of the means of access. It may be used whether the user's path to the host is through a network modem, cable TV, the Internet or one of many other means. Therefore, users are not required to invest in special hardware or equipment to access the host. In addition, the method may be password based so that users need only a password and possibly, a user ID—a paradigm familiar to most users today.

The present invention protects valuable resources by providing for authentication between two parties—for example, a computer user and a host computer. For computer users and hosts, the authentication may take place during the login sequence so that computer vandals may be prevented from entering the computer system. In addition, authentication may be enforced throughout a session between the user and host computer. Although the invention has been described in accordance with one preferred embodiment, it is to be understood that the present invention contemplates other embodiments compatible with the teachings herein. Various changes may be made to the number and types of values used, the formats of values used, and the functions applied to the data without departing from the spirit and scope of the invention. Also, the source of the values may differ in various embodiments. In addition, devices such as cable TV boxes may take the place of the user's computer and still be within the scope of the intended invention. Devices such as cellular telephones may take the place of the host computer and still be within the scope of the invention. A preferred or exemplary embodiment of the invention has been described.

What is claimed is:

1. A method of authentication, said method comprising the steps of:
   (i) generating a password, said password known to a first party and a second party;
   (ii) generating at least one challenge, said at least one challenge being generated by said first party, said second party, or a third party;
   (iii) generating a first value, said first value within a range of values determined prior to generating said first value and said first value being generated by said second party;
   (iv) generating a first response using said password, at least one of said challenges, and said first value, said first response being generated by said second party;

(v) transmitting said first response from said second party to said first party;

(vi) generating a second value, said second value within said range of values determined prior to generating said first value and said second value being generated by said first party;

(vii) generating a second response using said password, at least one of said challenges, and said second value, said second response being generated by said first party; and (viii) comparing said first response and said second response, said comparison performed by said first party.

2. The method according to claim 1, further comprising the step of repeating steps vi, vii, and viii until said first response and said second response match or until all of said second values within said range of values determined prior to generating said first value have been generated.

3. The method of claim 1, further comprising the steps of:

said first party generating a third response using said password, at least one of said challenges, and said second value;

transmitting said third response from said first party to said second party;

generating a fourth response using said password, at least one of said challenges, and said first value, said fourth response being generated by said second party; comparing said third response and said fourth response, said comparison being done by said second party.

4. The method of claim 1, further comprising the step of generating said first response using said password, at least one of said challenges, said first value, and at least one additional challenge from said second party and generating said second response using said password, at least one of said challenges, said second value, and at least one additional challenge from said second party.

5. The method of claim 1, wherein the step of generating said first value comprises the step of randomly generating said first value.

6. The method of claim 1 wherein said step of comparing said first response and said second response guarantees authentication of said second party by said first party.

7. The method of claim 1 wherein the step of generating second values within said range of values comprises generating said second values in ascending order beginning with the minimum value in said range of values.

8. The method of claim 1 wherein the step of generating second values within said range of values determined prior to generating said first value comprises generating said second values in descending order beginning with the maximum value in said range of values.

9. A system for authenticating comprising:

a first party;

a second party;

means for generating a password, said password known by said first party and by said second party;

means for generating at least one challenge, said at least one challenge being generated by said first party, said second party, or a third party;

means for said second party to generate a first value within a predetermined range of values;

means for said second party to generate a first response using said password, at least one of said challenges, and said first value;

means for transmitting said first response to said first party; and means for said first party to generate a plurality of second values within said predetermined range of values and a plurality of second responses using said password, at least one of said challenges, and one of said plurality of second values until said first response matches one of said plurality of second responses or until all of said second values within said predetermined range of values have been generated.

10. The system of claim 9, further comprising a means for generating said first response using said password, at least one of said challenges, said first value, and at least one additional challenge from said second party and a means for generating said plurality of second responses using said password, at least one of said challenges, said second values within said predetermined range of values, and at least one additional challenge from said second party.

11. The system of claim 9, further comprising:

means for said first party to generate a third response using said password, at least one of said challenges, and said second value;

means for said first party to transmit said third response to said second party;

means for said second party to generate a fourth response using said password, at least one of said challenges, and said first value;

means for said second party to compare said third response and said fourth response.

12. The system of claim 9, wherein said second value is randomly generated.

13. The system of claim 9 wherein said second party is authenticated if said first response and said second response match.

14. The system of claim 9 wherein said plurality of second values is generated in ascending order beginning with the minimum value in said predetermined range of values.

15. The system of claim 9 wherein said plurality of second values is generated in descending order beginning with the maximum value in said predetermined range of values.

16. A method of authentication, said method comprising the steps of:

providing a first party with a password;

providing a second party with said password;

establishing by communication between said first party and said second party, that said second party knows said password, said communication involving a value, said value known to said first party, said value within a determinate range of values known to said second party, and said value tested by said second party; and maintaining said communication free of revealing said password.

17. A system for authentication comprising:

a first party a second party;

a first response, said first response being generated by said second party from a first random value within a specified range of values known to said first party and said first response being transmitted to said first party;

a second response, said second response being generated by said first party at a cost substantially higher than the cost of generating said first response.

18. The system of claim 17 wherein said first party generates said second response in accordance with a plurality of second values within said specified range of values known to said first party.

19. The system of claim 17 wherein said second party is authenticated if said first response and said second response match.

* * * * *

UNITED STATES PATENT AND TRADEMARK OFFICE
CERTIFICATE OF CORRECTION

PATENT NO. : 5,872,917
DATED : February 16, 1999
INVENTOR(S) : Martin E. Hellman It is certified that error appears in the above-indentified patent and that said Letters Patent is hereby corrected as shown below:

In column 5, line 29, please delete the word "modem" and replace it with -- modern --.

In column 5, line 31, please delete the word "modem" and replace it with -- modern --.

Signed and Sealed this

Twenty-sixth Day of October, 1999

Attest:

Q. TODD DICKINSON

*Attesting Officer*    *Acting Commissioner of Patents and Trademarks*